(12) United States Patent
Tsai

(10) Patent No.: US 7,712,894 B2
(45) Date of Patent: May 11, 2010

(54) EYE GEAR HAVING QUICK-RELEASE FRAME COUPLING BLOCKS

(76) Inventor: York Tsai, No. 75-11, Siding 5th Neighborhood, Gongtian Village, Fanlu Township, Chiayi County (TW) 60247

( * ) Notice: Subject to any disclaimer, the term of this patent is extended or adjusted under 35 U.S.C. 154(b) by 0 days.

(21) Appl. No.: 12/189,728

(22) Filed: Aug. 11, 2008

(65) Prior Publication Data

US 2009/0279047 A1 Nov. 12, 2009

(51) Int. Cl.
G02C 1/08 (2006.01)
(52) U.S. Cl. .................... 351/97; 351/116; 351/153; 16/228
(58) Field of Classification Search .............. 351/41, 351/90–102, 111, 116, 121, 140, 149, 153, 351/154; 16/228
See application file for complete search history.

(56) References Cited

U.S. PATENT DOCUMENTS

| 4,153,347 A | 5/1979 | Myer | 351/90 |
| 4,971,431 A | 11/1990 | Maradan | 351/86 |
| 5,726,732 A | 3/1998 | Kobayashi | 351/97 |
| 2005/0225717 A1 | 10/2005 | Reane | 351/153 |

Primary Examiner—Huy K Mai
(74) Attorney, Agent, or Firm—Christie, Parker & Hale, LLP

(57) ABSTRACT

An eye gear includes a lens frame, a support unit having a pair of frame coupling blocks, and a pair of coupling units, each connecting pivotally one end of a respective one of the frame coupling blocks to a corresponding one of two ends of the lens frame and including a first pivot coupling component provided on one of the lens frame and the respective one of the frame coupling blocks, and a second pivot coupling component provided on the other of the lens frame and the respective one of the frame coupling blocks. The first pivot coupling component includes a pin portion. The second pivot coupling component includes a limiting portion that defines a pin receiving space to receive removably and pivotally the pin portion.

8 Claims, 12 Drawing Sheets

US 7,712,894 B2

EYE GEAR HAVING QUICK-RELEASE FRAME COUPLING BLOCKS

BACKGROUND OF THE INVENTION

1. Field of the Invention

This invention relates to an eye gear, more particularly to an eye gear having quick-release frame coupling blocks.

2. Description of the Related Art

Referring to FIG. 1, a conventional pair of eyeglasses 1 includes a frame 12, a pair of lenses 11 mounted onto the frame 12, a pair of bows 13 respectively mounted on outer ends of the frame 12, and a pair of screws 14 respectively securing the bows 13 onto the frame 12.

Ergonomics in eye gear design has increasingly become an important buying consideration for some consumers in recent years. It is therefore desirable to provide an ergonomic design for eye gear in which the eye gear is equipped with quick release bows. That is, the bows 13 can be secured to the frame without using screws.

SUMMARY OF THE INVENTION

Therefore, it is an object of the present invention to provide an eye gear that has quick-release frame coupling blocks.

According to the present invention, an eye gear includes a lens frame, a support unit, and a pair of coupling units. The support unit supports the lens frame on a face of a wearer, and includes a pair of frame coupling blocks. Each of the coupling units connects pivotally and removably one end of a respective one of the frame coupling blocks to a corresponding one of two ends of the lens frame such that the respective one of the frame coupling blocks is pivotable relative to the lens frame about a pivot axis. Each of the coupling units includes a first pivot coupling component provided on one of the lens frame and the respective one of the frame coupling blocks, and a second pivot coupling component provided on the other of the lens frame and the respective one of the frame coupling blocks. The first pivot coupling component includes a pin portion that defines a pin axis parallel to the pivot axis. The second pivot coupling component includes a limiting portion that defines a pin receiving space extending away from the one end of the other of the lens frame and the respective one of the frame coupling blocks in a direction transverse to the pivot axis. The pin receiving space has an access opening section and a pin retaining section respectively distal from and proximate to the one end of the other of the lens frame and the respective one of the frame coupling blocks. The pin portion is extendible removably into the pin receiving space via the access opening section so as to be pivotally disposed in the pin retaining section to permit relative pivoting movement between the lens frame and the respective one of the frame coupling blocks about the pin axis defined by the pin portion. The pin axis serves as the pivot axis when the pin portion is disposed in the pin retaining section.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
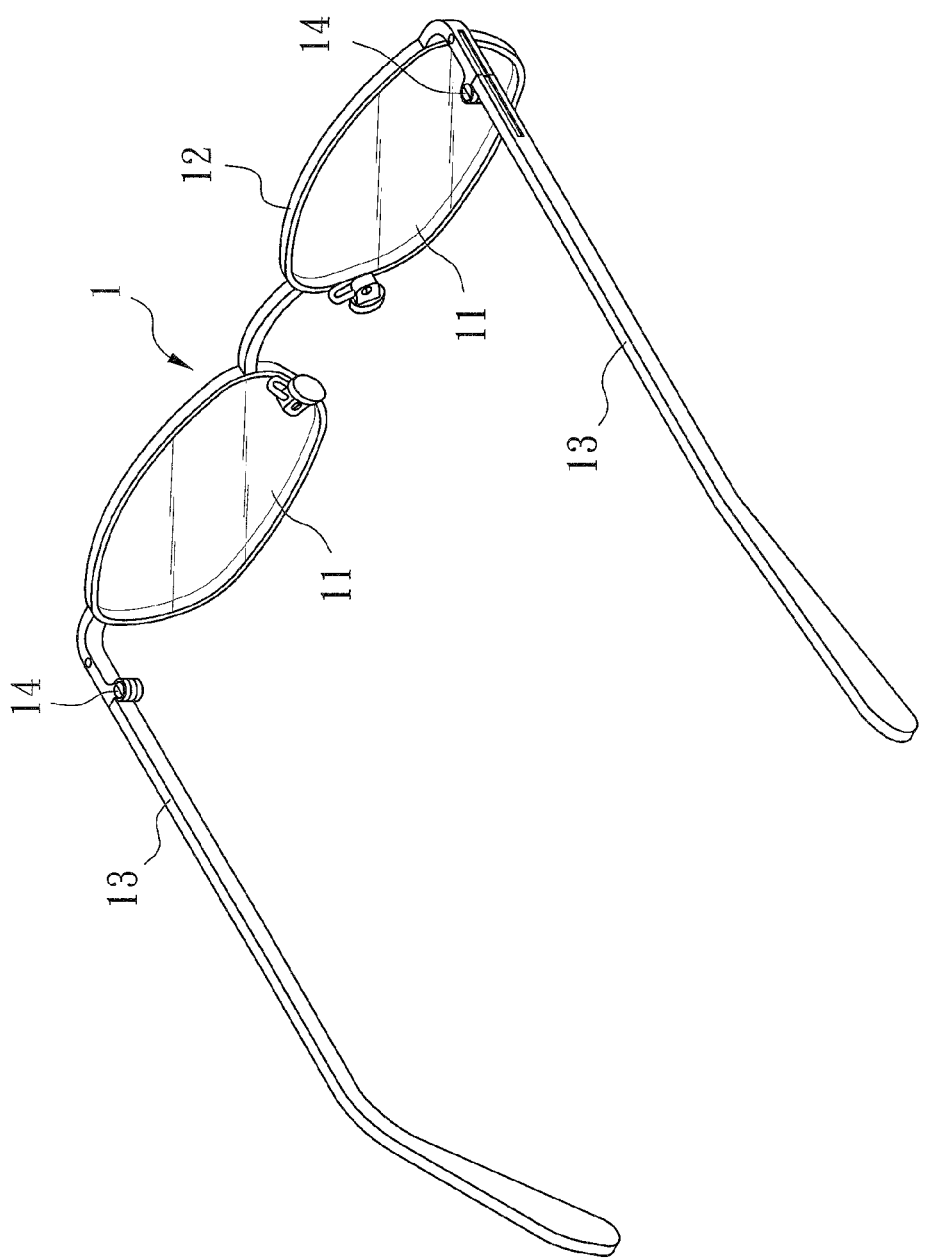
FIG. 1 is a perspective view of a conventional pair of eyeglasses.

Before the present invention is described in greater detail with reference to the preferred embodiments, it should be noted herein that like elements are denoted by the same reference numerals throughout the disclosure.

Figure 2:
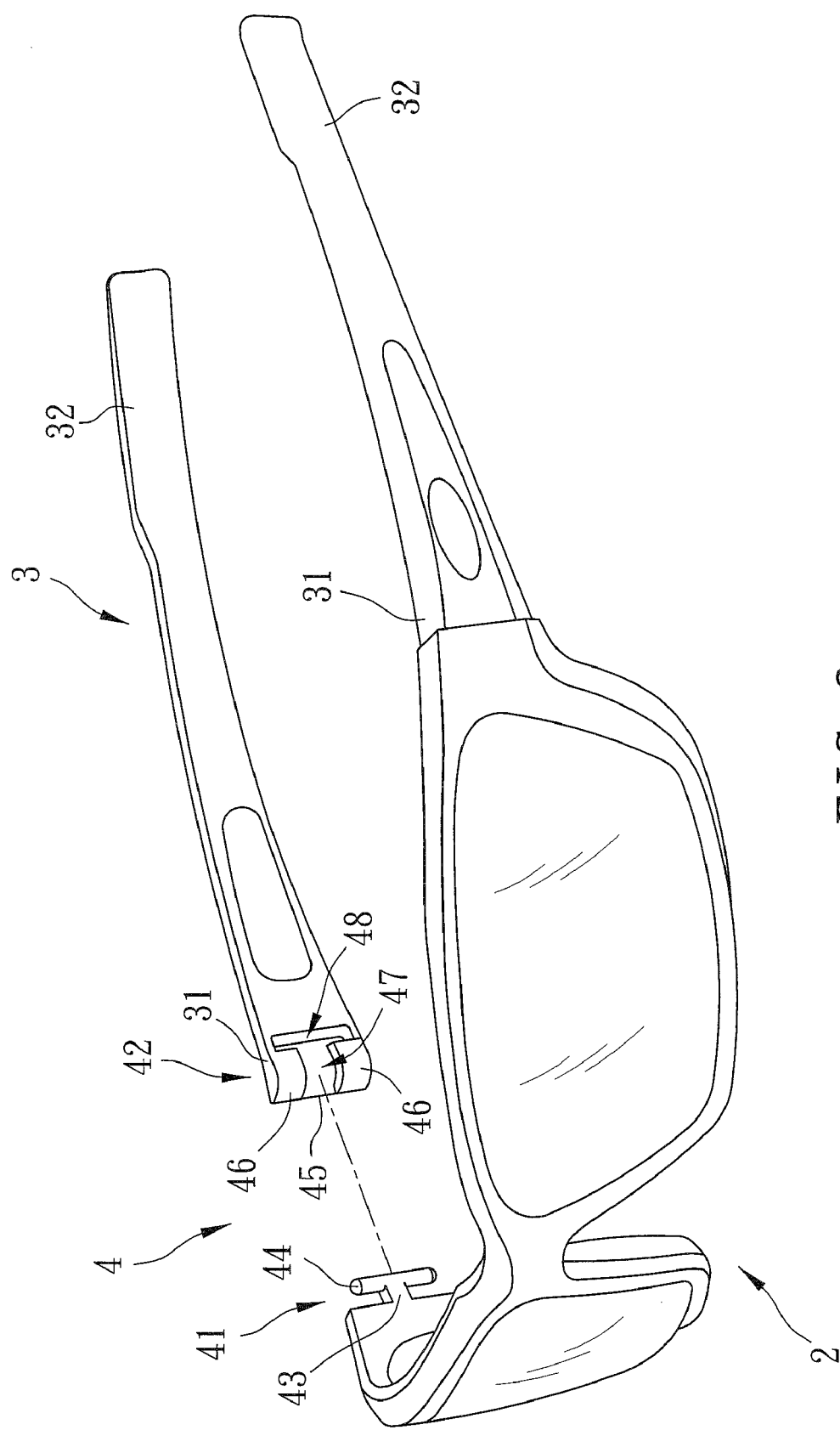
FIG. 2 is a partly exploded perspective view of the first embodiment of an eye gear according to the present invention.
Figure 3:
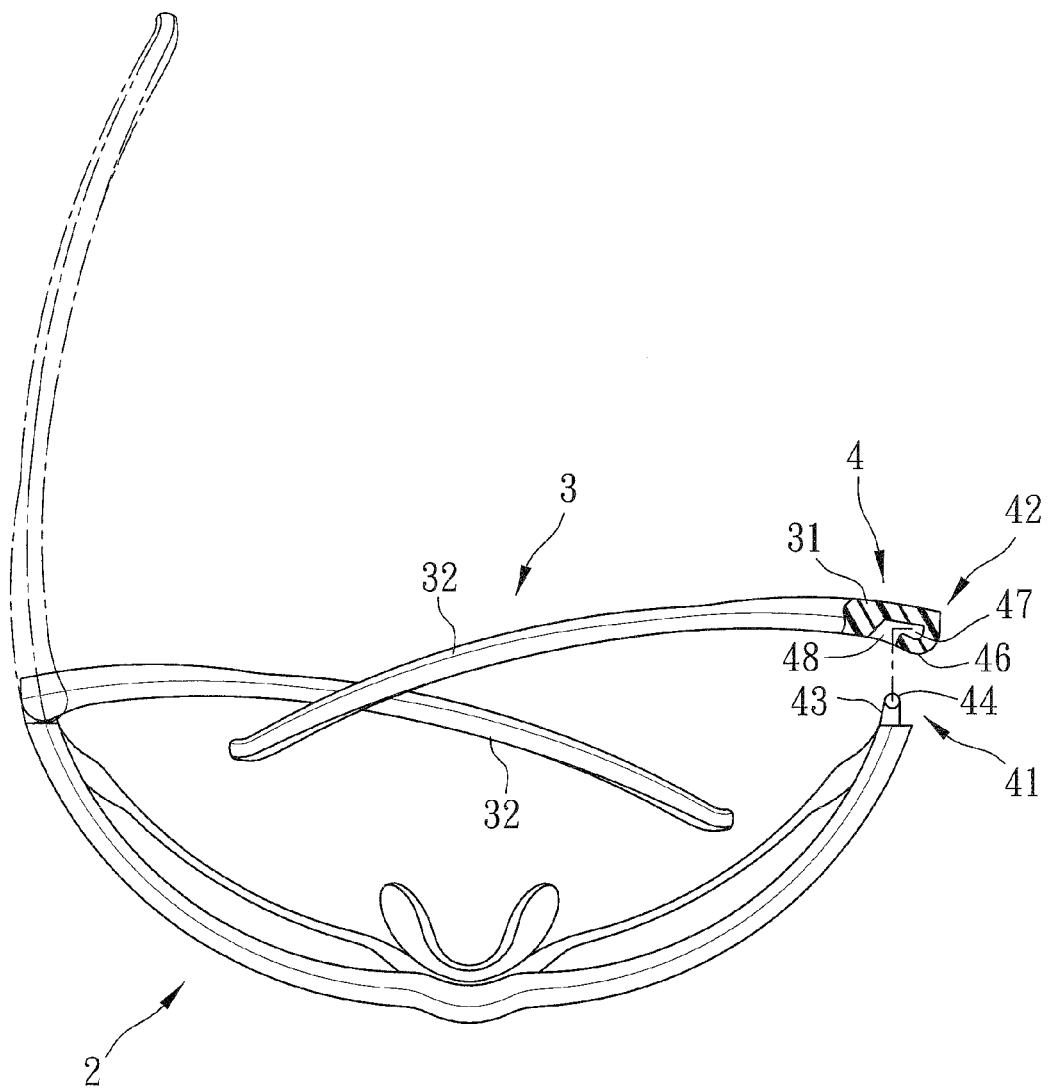
FIG. 3 is a partly sectional, schematic top view of the eye gear of FIG. 2.

FIGS. 2 and 3 show the first embodiment of an eye gear of the present invention. The eye gear includes a lens frame 2, a support unit 3, and a pair of coupling units 4. The support unit 3 supports the lens frame 2 on a face of a wearer, and includes a pair of frame coupling blocks 31 and a pair of bows 32, each of which is connected integrally to a respective one of the frame coupling blocks 31. Each of the coupling units 4 connects pivotally and removably one end of a respective one of the frame coupling blocks 31 to a corresponding one of two ends of the lens frame 2 such that the respective one of the frame coupling blocks 31 is pivotable relative to the lens frame 2 about a pivot axis. In this embodiment, each of the coupling units 4 includes a first pivot coupling component provided on the lens frame 2, and a second pivot coupling component provided on the respective one of the frame coupling blocks 31.

The first pivot coupling component includes a pin portion 41 that defines a pin axis parallel to the pivot axis. The second pivot coupling component includes a limiting portion 42 that defines a pin receiving space extending away from the one end of the respective one of the frame coupling blocks 31 in a direction transverse to the pivot axis. The pin receiving space has an access opening section 48 and a pin retaining section 47 respectively distal from and proximate to the one end of the respective one of the frame coupling blocks 31. The pin portion 41 is extendible removably into the pin receiving space via the access opening section 48 so as to be pivotally disposed in the pin retaining section 47 to permit relative pivoting movement between the lens frame 2 and the respective one of the frame coupling blocks 31 about the pin axis defined by the pin portion 41. The pin axis serves as the pivot axis when the pin portion 41 is disposed in the pin retaining section 47. Through the first and second pivot coupling components of the coupling units 4, a quick-release screwless connection between the lens frame 2 and the frame coupling blocks 31 of the support unit 3 is thus possible.

In this embodiment, the pin portion 41 includes a spacer segment 43 projecting from the one end of the lens frame 2, and a pivot segment 44 connected to one end of the spacer segment 43 and defining the pin axis. The limiting portion 42 includes at least one stop plate 46 that extends from the one end of the respective one of the frame coupling blocks 31, and that cooperates with the respective one of the frame coupling blocks 31 to define the pin receiving space. The limiting portion 42 is formed with a slot 45 that is in spatial communication with the pin receiving space and that extends in the direction transverse to the pivot axis from the access opening section 48 toward the pin retaining section 47. The pivot segment 44 is disposed removably in the pin receiving space, and the spacer segment 43 extends through the slot 45 in the limiting portion 42.

In this embodiment, the pivot segment 44 has a middle part connected to the spacer segment 43, and opposite end parts that project in opposite directions from the middle part and that are disposed along the pin axis. The limiting portion 42 includes two of the stop plates 46 having the slot 45 disposed therebetween. Each of the stop plates 46 serves to retain pivotally a respective one of the end parts of the pivot segment 44 in the pin receiving space.

Figure 4:
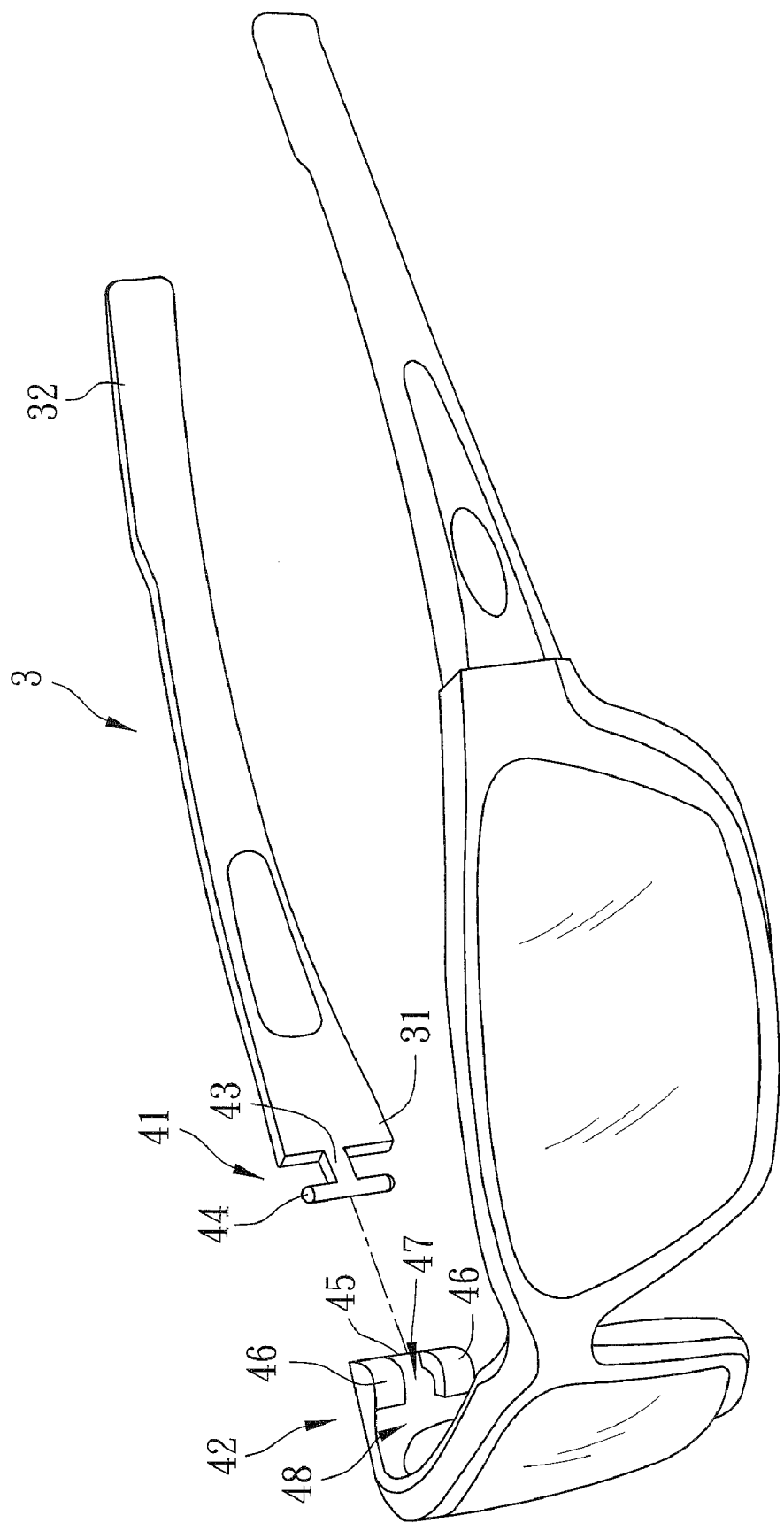
FIG. 4 is a partly exploded perspective view of the second embodiment of the eye gear according to the present invention.

FIG. 4 illustrates the second embodiment of the present invention. The second embodiment of the present invention differs from the first embodiment in that the first pivot coupling component is provided on the respective one of the frame coupling blocks 31, and the second pivot coupling component is provided on the lens frame 2. Since the interaction between the first and second pivot coupling components is the same as that described above in connection with the first embodiment, further details of the second embodiment are omitted herein for the sake of brevity.

Figure 5A:
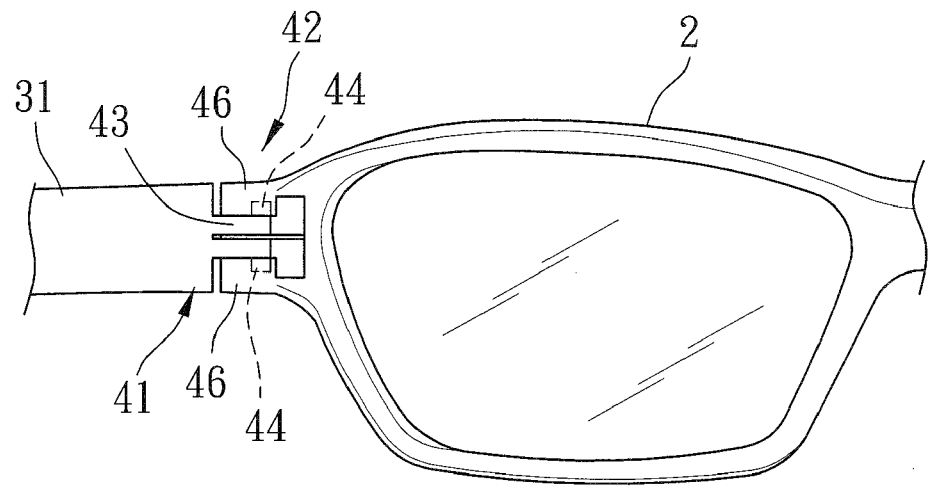
FIGS. 5(a) and 5(b) are fragmentary schematic views of the third embodiment of the eye gear according to the present invention.
Figure 5B:
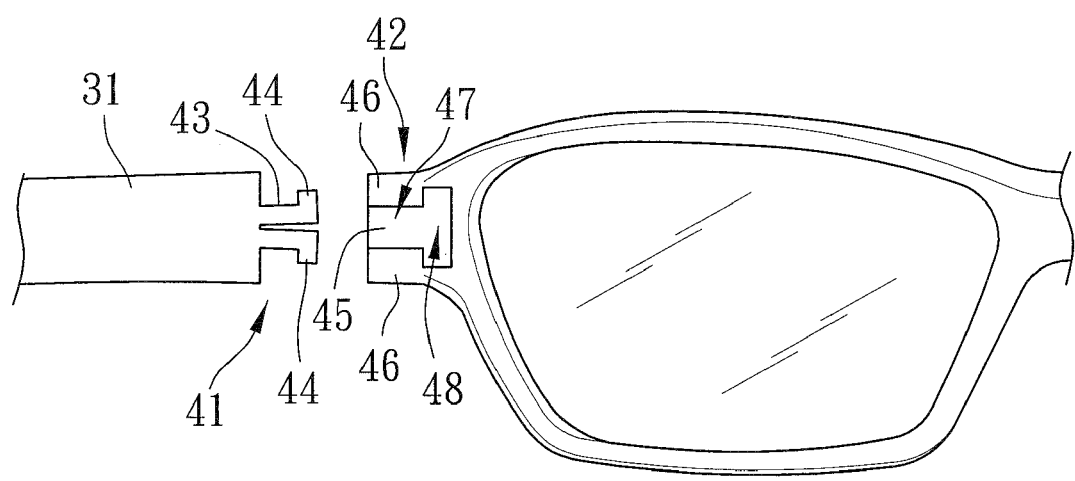

FIGS. 5(a) and 5(b) illustrates the third preferred embodiment of the present invention. The third embodiment of the present invention differs from the second embodiment in that the pin portion 41 includes a pair of parallel spacer segments 43 projecting from the respective one of the frame coupling blocks 31, and a pair of aligned pivot segments 44, each of which is connected to one end of a respective one of the spacer segments 43 and defines the pin axis. The pivot segments 44 are disposed removably in the pin retaining space and are retained pivotally therein by the stop plates 46. The spacer segments 43 extend through the slot 45 in the limiting portion 42 and are pressed toward each other by the stop plates 46.

Figure 6:
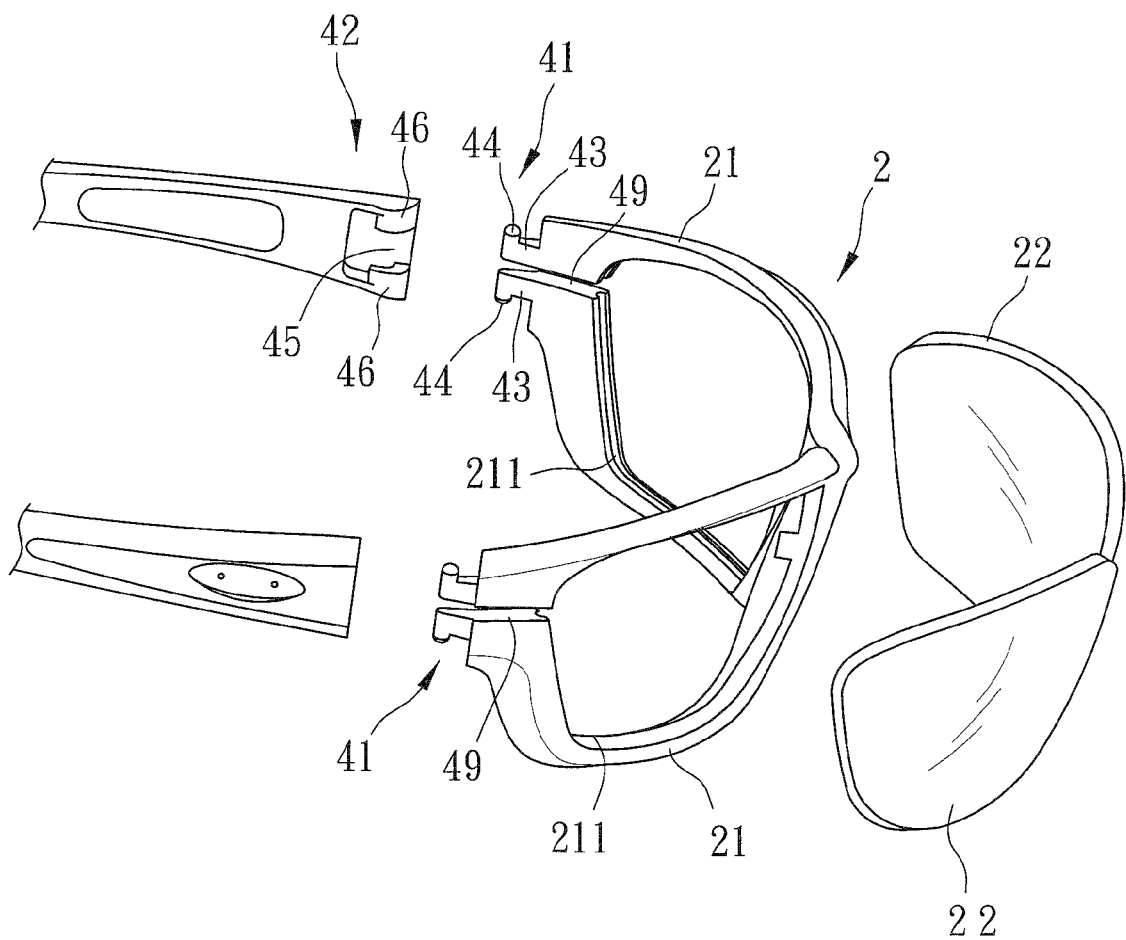
FIG. 6 is a fragmentary exploded perspective view of the fourth embodiment of the eye gear according to the present invention.
Figure 7A:
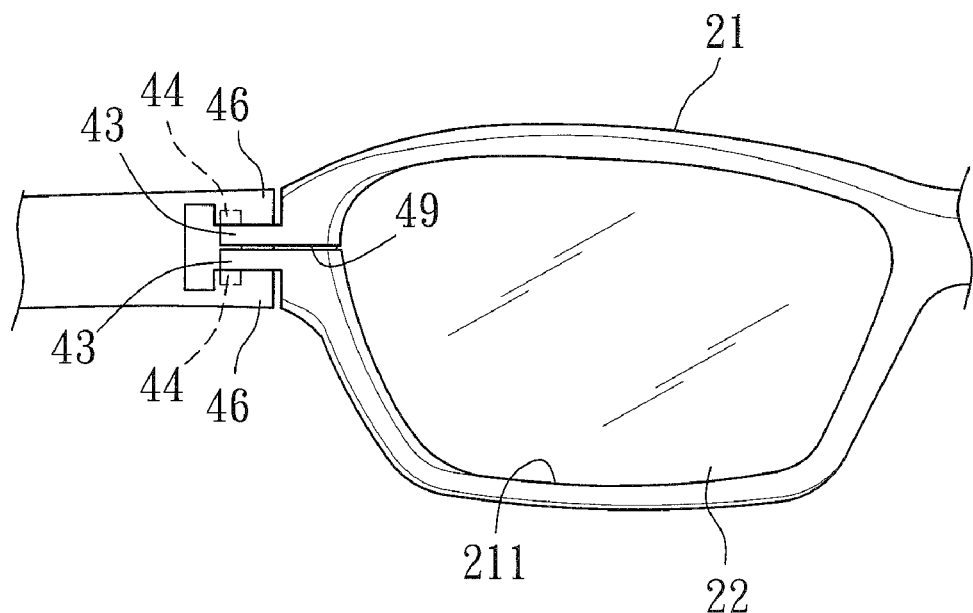
FIGS. 7(a) and 7(b) are fragmentary schematic side views of the fourth embodiment.
Figure 7B:
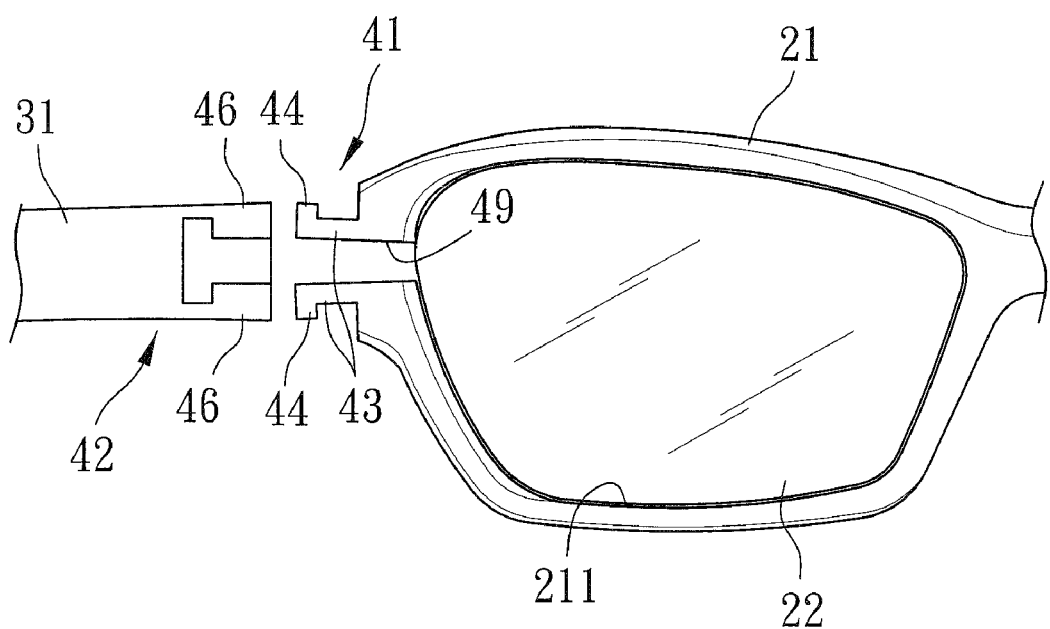

FIGS. 6, 7(a) and 7(b) illustrate the fourth embodiment of the present invention. In this embodiment, the lens frame 2 includes a pair of lens receiving portions 21, each of which is formed with a lens receiving space 211 and a slit 49 that extends from the lens receiving space 211 to a respective one of the two ends of the lens frame 2. The eye gear further comprises a pair of lens units 22 received removably and respectively in the lens receiving spaces 211 of the lens receiving portions 21. The fourth embodiment differs from the first embodiment in that the pin portion 41 includes a pair of parallel spacer segments 43 projecting from the corresponding one of the two ends of the lens frame 2 and disposed at two sides of a respective one of the slits 49, and a pair of aligned pivot segments 44, each of which is connected to one end of a respective one of the spacer segments 43 and defines the pin axis. The pivot segments 44 are disposed removably in the pin receiving space and are retained pivotally therein by the stop plates 46. The spacer segments 43 extend through the slot 45 in the limiting portion 42 and are pressed toward each other by the stop plates 46 to constrict the lens receiving space 211 of the respective one of the lens receiving portions 21 for retaining the respective one of lens units 22 therein. This embodiment further has an advantage of facilitating replacement of the lens unit 22.

Figure 8:
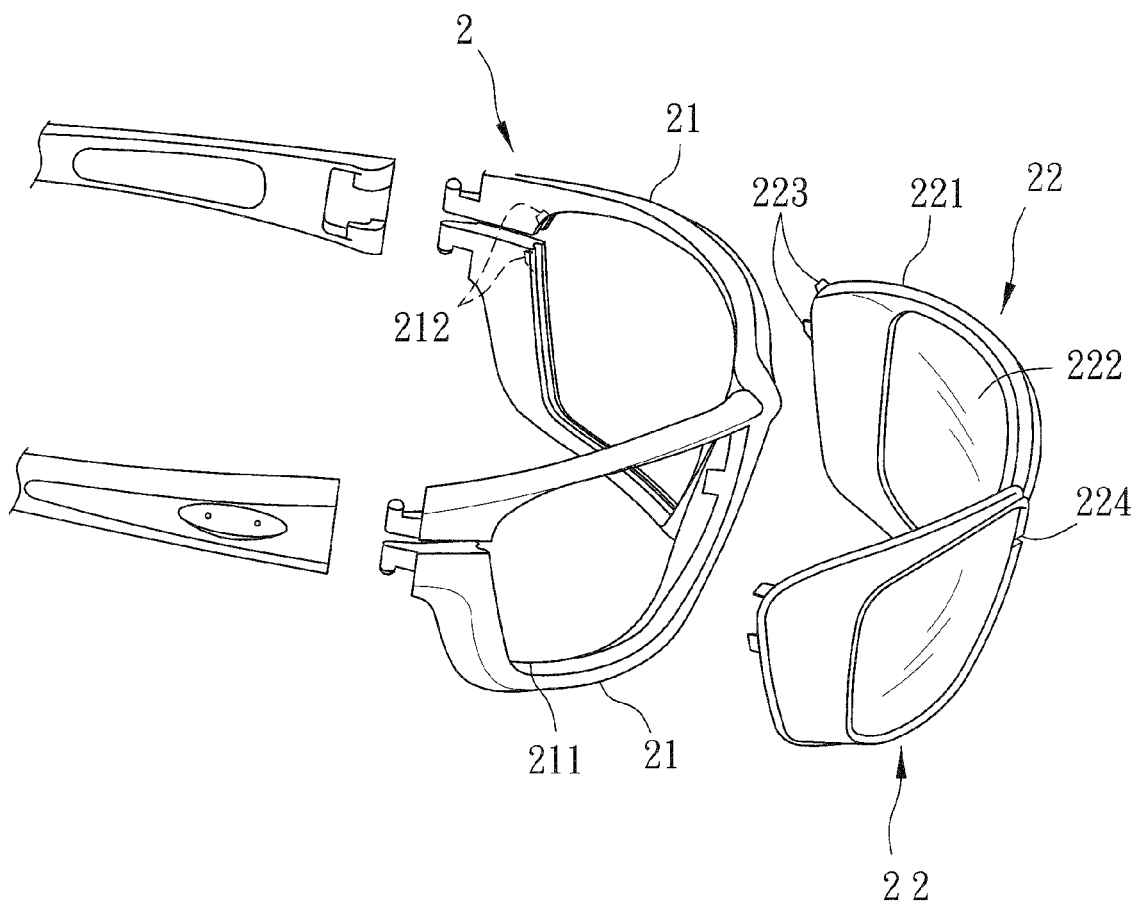
FIG. 8 is a fragmentary exploded perspective view of the fifth embodiment of the eye gear according to the present invention.
Figure 9A:
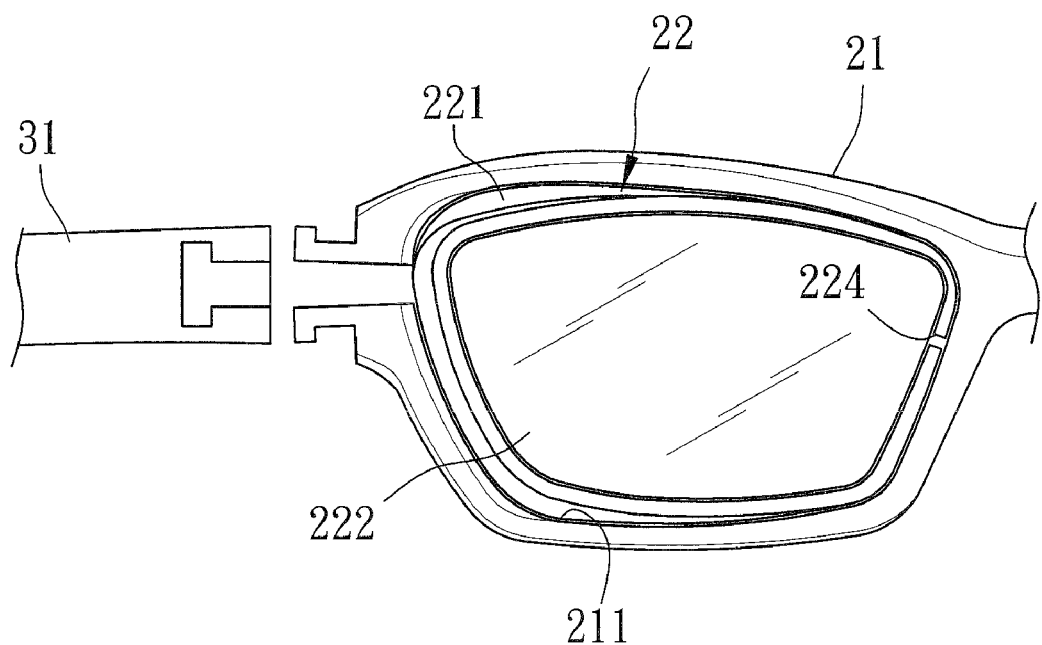
FIGS. 9(a) and 9(b) are fragmentary schematic side views of the fifth embodiment.
Figure 9B:
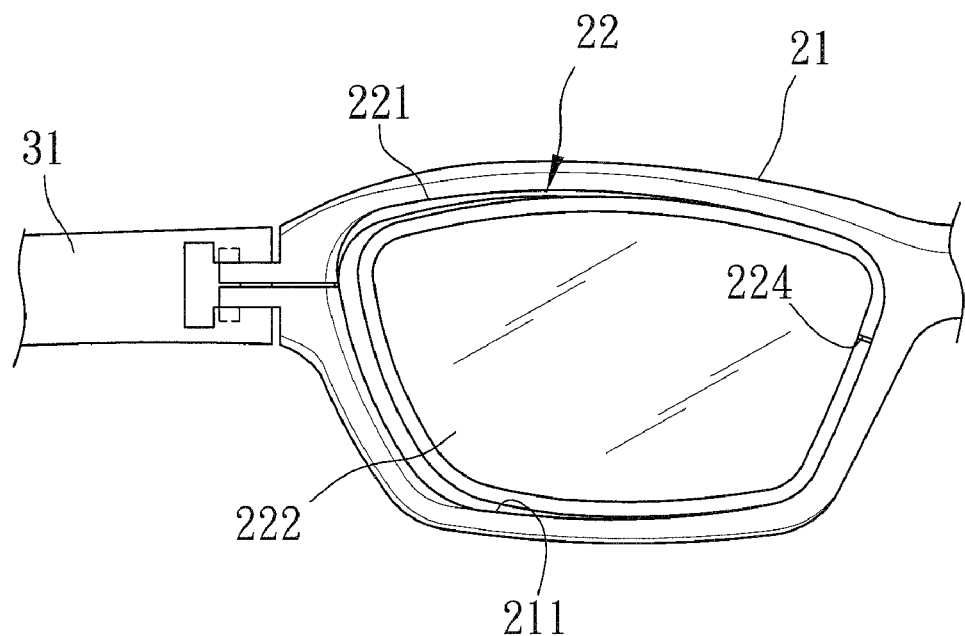

FIGS. 8, 9(a) and 9(b) illustrate the fifth embodiment of the present invention. The fifth preferred embodiment of the present invention differs from the fourth embodiment in that each of the lens units 22 includes a lens piece 222 and an inner frame member 221 that engages removably a periphery of the lens piece 221. Each of the lens receiving portions 21 is formed with a first locking unit in the form of two grooves 212. The inner frame member 221 of each of the lens units 22 is formed with a second locking unit in the form of two tongues 223 to engage removably the grooves 212 of the respective one of the lens receiving portions 21. It is noted that the numbers of the grooves 212 and the tongue 223 can vary in other embodiments of the invention. In addition, the first locking unit could include at least one tongue and the second locking unit could include at least one grove in other embodiments of this invention. Further, the inner frame member 221 of each of the lens units 22 is formed with a cutout 224. The inner frame member 221 is pressed by the respective one of the lens receiving portions 21 when the lens receiving space 211 is constricted so as to constrict the cutout 224 to retain the lens piece 221 in the inner frame member 221. Since the mechanism for constricting the lens receiving space 211 is similar to that described above in connection with the fourth embodiment, further details of the fifth embodiment are omitted herein for the sake of brevity.

Figure 10:
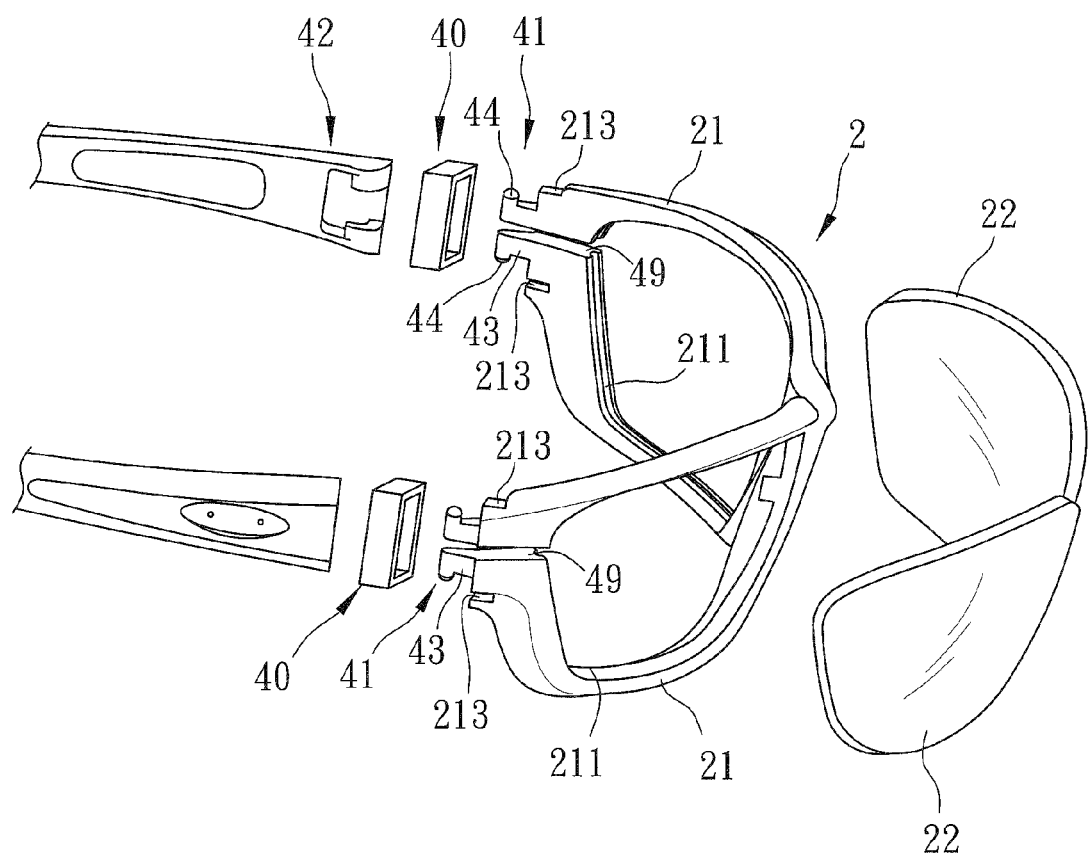
FIG. 10 is a fragmentary exploded perspective view of the sixth embodiment of the eye gear according to the present invention.
Figure 11A:
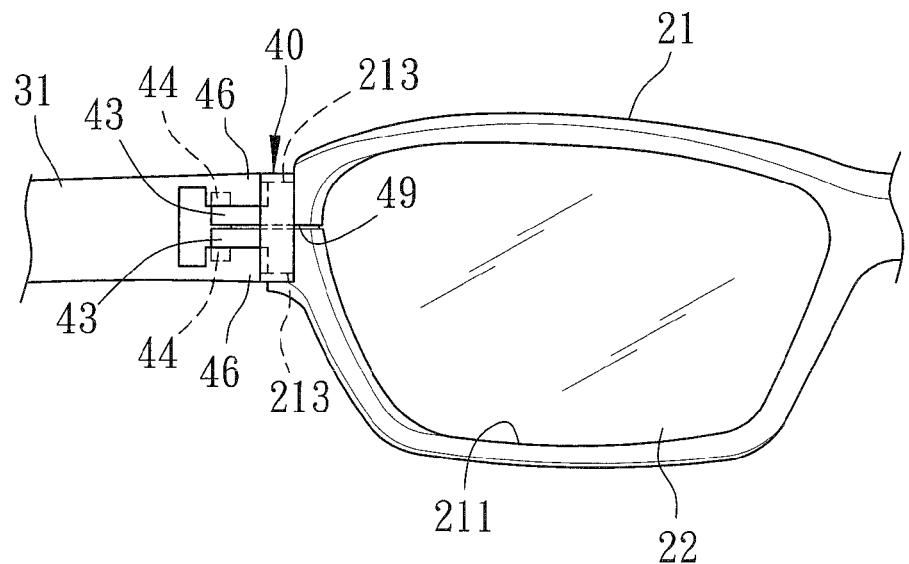
FIGS. 11(a) and 11(b) are fragmentary schematic side views of the sixth embodiment.
Figure 11B:
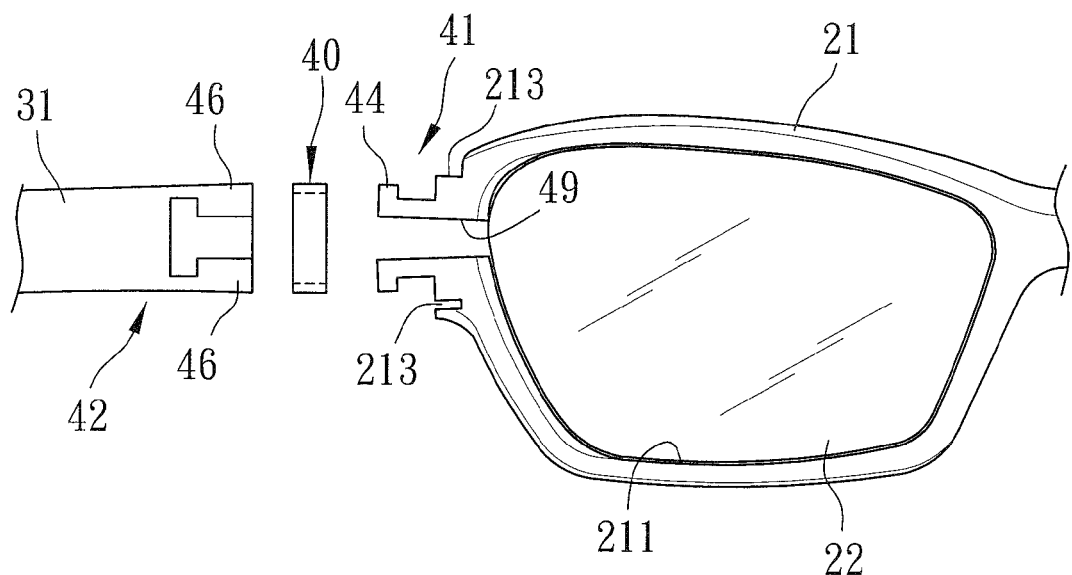

FIGS. 10, 11(a), and 11(b) illustrate the sixth embodiment of the present invention. The sixth preferred embodiment of the present invention differs from the fourth embodiment in that each of the lens receiving portions 21 of the lens frame 2 is further formed with a pair of shoulder parts 213 that project from the respective one of the two ends of the lens frame 2 and that are disposed on two sides of the slit 49. The eye gear further includes a pair of bands 40, each of which is sleeved removably on the shoulder parts 213 of a respective one of the lens receiving portions 21 to constrict the lens receiving space 211 of the respective one of the lens receiving portions 21 for retaining the respective one of the lens units 22 therein. In addition, each of the spacer segments 43 projects from a respective one of the shoulder parts 213 on a respective one of the lens receiving portions 21. By virtue of the bands 40, unintentional removal of the lens units 22 from the lens receiving portions 21 can be prevented when the pin portions 41 are removed from the limiting portions 42.

Figure 12:
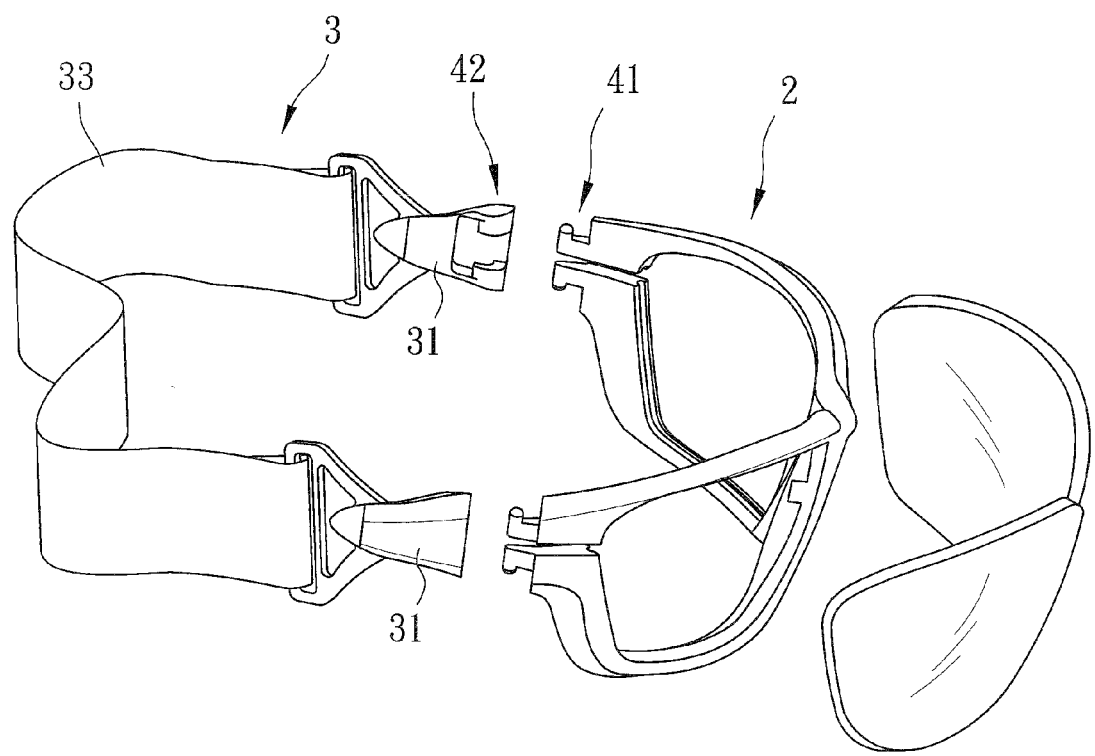
FIG. 12 is an exploded perspective view of the seventh embodiment of the eye gear according to the present invention.

FIG. 12 illustrates the seventh embodiment of the present invention. The seventh embodiment of the present invention differs from the fourth embodiment in that, instead of a pair of bows, the support unit 3 includes a head strap 33 having opposite ends connected to the frame coupling blocks 31, respectively. It is noted that the bows of the other embodiments may be similarly replaced by the head strap 33.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An eye gear comprising:

a lens frame;

a support unit for supporting said lens frame on a face of a wearer, said support unit including a pair of frame coupling blocks; and a pair of coupling units, each of which connects pivotally and removably one end of a respective one of said frame coupling blocks to a corresponding one of two ends of said lens frame such that the respective one of said frame coupling blocks is pivotable relative to said lens frame about a pivot axis;

each of said coupling units including a first pivot coupling component provided on one of said lens frame and the respective one of said frame coupling blocks, and a second pivot coupling component provided on the other of said lens frame and the respective one of said frame coupling blocks;

said first pivot coupling component including a pin portion that defines a pin axis parallel to said pivot axis;

said second pivot coupling component including a limiting portion that defines a pin receiving space extending away from said one end of the other of said lens frame and the respective one of said frame coupling blocks in a direction transverse to said pivot axis, said pin receiving space having an access opening section and a pin retaining section respectively distal from and proximate to said one end of the other of said lens frame and the respective one of said frame coupling blocks;

said pin portion being extendible removably into said pin receiving space via said access opening section so as to be pivotally disposed in said pin retaining section to permit relative pivoting movement between said lens frame and the respective one of said frame coupling blocks about said pin axis defined by said pin portion, said pin axis serving as said pivot axis when said pin portion is disposed in said pin retaining section;

wherein said first pivot coupling component is provided on said lens frame, said second pivot coupling component is provided on the respective one of said frame coupling blocks, and said lens frame includes a pair of lens receiving portions, each of which is formed with a lens receiving space and a slit that extends from said lens receiving space to a respective one of said two ends of said lens frame, said eye gear further comprising a pair of lens units received removably and respectively in said lens receiving spaces of said lens receiving portions;

said pin portion including a pair of parallel spacer segments projecting from the corresponding one of said two ends of said lens frame and disposed at two sides of a respective one of said slits, and a pair of aligned pivot segments, each connected to one end of a respective one of said spacer segments and defining said pin axis;

said limiting portion including a pair of stop plates extending from said one end of the respective one of said frame coupling blocks and cooperating with the respective one of said frame coupling blocks to define said pin receiving space, said limiting portion being formed with a slot that is disposed between said stop plates, that is in spatial communication with said pin receiving space, and that extends in the direction transverse to said pivot axis from said access opening section toward said pin retaining section;

said pivot segments being disposed removably in said pin receiving space and being retained pivotally therein by said stop plates, said spacer segments extending through said slot in said limiting portion and being pressed toward each other by said stop plates to constrict said lens receiving space of the respective one of said lens receiving portions for retaining the respective one of said lens units therein.

2. The eye gear as claimed in claim 1, wherein said support unit further includes a pair of bows, each of which is connected integrally to a respective one of said frame coupling blocks.

3. The eye gear as claimed in claim 1, wherein each of said lens units includes a lens piece and an inner frame member that engages removably a periphery of said lens piece, each of said lens receiving portions being formed with a first locking unit, said inner frame member of each of said lens units being formed with a second locking unit to engage removably said first locking unit of the respective one of said lens receiving portions.

4. The eye gear as claimed in claim 3, wherein one of said first and second locking units includes a groove, and the other of said first and second locking units includes a tongue to engage said groove.

5. The eye gear as claimed in claim 3, wherein said inner frame member of each of said lens units is formed with a cutout, said inner frame member being pressed by the respective one of said lens receiving portions when said lens receiving space is constricted so as to constrict said cutout to retain said lens piece in said inner frame member.

6. The eye gear as claimed in claim 1, wherein each of said pair of lens receiving portions is formed with a pair of shoulder parts that project from the respective one of said two ends of said lens frame and that are disposed on two sides of said slit, said eye gear further comprising a pair of bands, each of which is sleeved removably on said shoulder parts of a respective one of said lens receiving portions to constrict said lens receiving space of the respective one of said lens receiving portions for retaining the respective one of said lens units therein;

each of said pair of parallel spacer segments projecting from a respective one of said shoulder parts on a respective one of said lens receiving portions.

7. The eye gear as claimed in claim 1, wherein said support unit further includes a head strap having opposite ends connected to said frame coupling blocks, respectively.

8. The eye gear as claimed in claim 1, wherein said support unit further includes a pair of bows, each of which is connected integrally to a respective one of said frame coupling blocks, and said portion is extendible removably into said pin receiving space to connect or disconnect said respective one of said frame coupling blocks and said corresponding one of two ends of said lens frame only when a corresponding one of said pair of bows is oriented in a substantially folded position with respect to said lens frame.

* * * * *